Aug. 23, 1932. W. G. WILSON 1,873,855
FLUID TIGHT JOINT AND METHOD OF MAKING
Filed Nov. 7, 1929
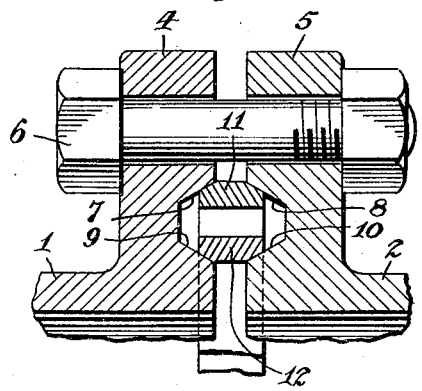
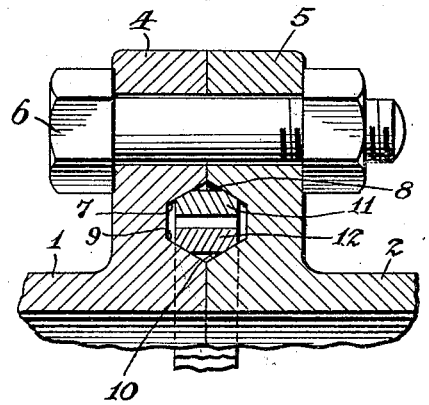
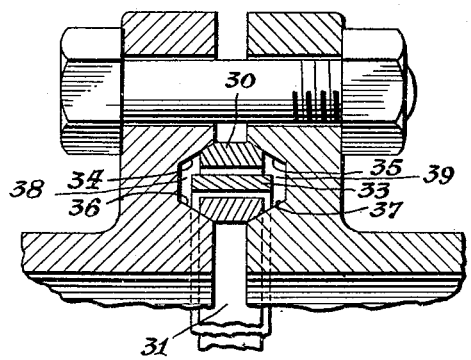
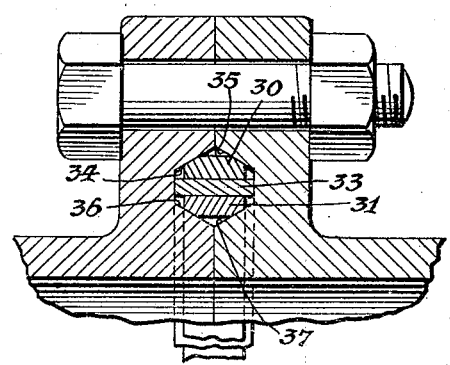
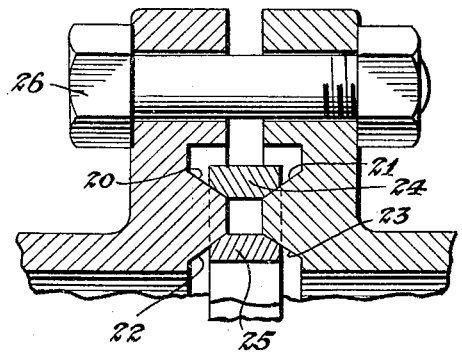
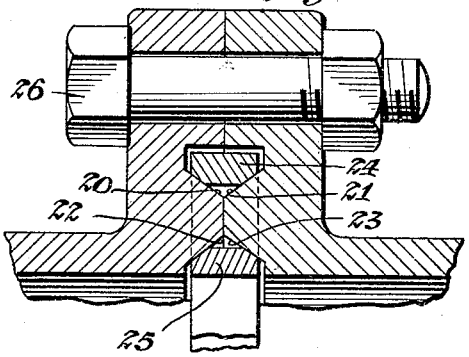
Inventor
Wylie G Wilson
By his Attorney Patented Aug. 23, 1932

1,873,855

UNITED STATES PATENT OFFICE

WYLIE G. WILSON, OF ELIZABETH, NEW JERSEY

FLUID TIGHT JOINT AND METHOD OF MAKING

Application filed November 7, 1929. Serial No. 405,390.

This invention relates to a fluid tight joint and to the method of making the same. The joint is particularly useful in connecting together sections of metal pipe used to transmit fluids under pressure and hence it will be disclosed in that connection. It will be obvious, however, that the invention may be used for other purposes.

Heretofore in the art pipes have usually been joined by simple threaded sleeves, or by constructions involving more or less plastic gaskets or accurately ground abutting surfaces. Simple threaded sleeves are not customarily used for large sizes of pipe because of the difficulty of making a leak tight joint and the difficulty of rotating the pipe in making the joint; also joints made with simple threaded sleeves have a rough interior; as usually made the pipe must be rotated in installing the sleeves; and the relative position of the two sections of pipe cannot be accurately predetermined. Gaskets of more or less plastic material are apt to be blown out by high pressure; they deteriorate with age and heat; and in many cases, great force must be used in clamping together the parts with which the gasket is associated. Also with this type of joint the relative position of the two sections of pipe cannot be accurately predetermined because of variations in thickness and variations in compressibility of the gasket. Accurately ground abutting surfaces are expensive to manufacture; it is difficult to construct them to hold high pressures; and such joints are not suitable for many purposes. Other types of joints have been proposed, but the types above referred to are the ones most extensively used.

The general object of the present invention is to provide a joint structure and/or method of making a joint which will be reliable and permanently fluid tight against high pressures and can be manufactured at low cost by ordinary commercial methods.

Another object of the invention is to provide a joint structure and/or method of making a joint which will withstand high fluid pressure without requiring greater manufacturing precision or greater care in assembly than is involved in ordinary commercial work.

Another object of the invention is to provide for automatic alignment of the pipes or the like to be joined without any special care in assembly.

A still further object of the invention is to provide a joint structure in which the final position of the parts joined can be accurately predetermined.

Other objects of the invention will be obvious from the following disclosure.

Various difficulties of the prior art are overcome by the present invention which is disclosed in a form in which two pieces of pipe or the like are sealed together by two one-piece sealing rings, which cooperate with inclined sealing surfaces at the ends of the pipe. The sealing rings have tapered annular sealing surfaces which are complementary to the sealing surfaces on the ends of the pipe; and the construction is such that the sealing surfaces on the pipe exert pressure on the sealing surfaces on the rings and slide over such surfaces as the ends of the pipe are drawn together. In this way, the sealing surfaces on the pipe are lapped into sealing fit with the rings. One of the sealing rings has its sealing surfaces on its interior and the other has its sealing surfaces on its exterior so that as the pipe ends are drawn together, one ring is circumferentially expanded as a unit and the other ring is circumferentially contracted as a unit. Due to the resiliency of the metal of the rings, a heavy permanent sealing pressure is then exerted over the contracting area between the sealing surfaces of the rings and the sealing surfaces of the pipe.

Fig. 1 is a fragmentary sectional view taken longitudinally of the pipe showing one form of the invention with the parts assembled preparatory to making the joint.

Fig. 2 is a view similar to Fig. 1 showing the completed joint.

Fig. 3 is a fragmentary sectional view taken longitudinally of the pipe showing a modified form of the invention with the parts assembled preparatory to making the joint.

Fig. 4 is a view similar to Fig. 3 showing the completed joint.

Fig. 5 is a fragmentary sectional view taken longitudinally of the pipe showing a second modification of the invention with the parts assembled preparatory to making the joint.

Fig. 6 is a view similar to Fig. 5 showing the completed joint.

Reference will now be had to Figs. 1 and 2. Sections of pipe 1 and 2 are provided with suitable means for drawing the ends together, such as ends or fittings having flanges 4 and 5 adapted to be drawn together by bolts 6, as is well understood in the art. The flanges are provided with annular recesses so formed as to provide inclined annular sealing surfaces 7, 8, 9 and 10. Sealing rings 11 and 12 have inclined sealing surfaces which, when the parts are initially assembled, engage the surfaces 7, 8, 9, and 10 as shown in Fig. 1. Each of the rings 11 and 12 is a continuous solid ring of metal, preferably similar to the metal of the pipe. The metal of the rings is preferably resilient and is also preferably malleable or worked metal or ductile metal; and the rings are so proportioned that upon sufficient pressure being applied to their inclined surfaces, the ring either expands circumferentially as a unit or contracts circumferentially as a unit, as the case may be.

After the parts have been initially assembled as shown in Fig. 1, the flanges 4 and 5 are drawn together by bolts 6. This causes the inclined surfaces 7, 8, 9, and 10 to exert pressure on the corresponding inclined surfaces of the two sealing rings; and as the flanges are drawn together, the surfaces 7, 8, 9, and 10 slide over the corresponding inclined surfaces on the sealing rings while exerting considerable pressure on those surfaces. This sliding of surfaces under pressure causes local action on the metal of the sliding surfaces which is in effect a local cold working which to some extent densifies the surface metal; it also so removes machining irregularities as to produce a sealing fit capable of withstanding high pressure. This local action by which the sealing fit is produced is a lapping action. The pressure exerted on the inclined sealing surfaces of the ring 11 by the surfaces 7 and 8 also contracts the ring as a unit. Preferably the sealing ring is resilient so that permanent sealing pressure is maintained at the surfaces 7 and 8 even though the parts (or the pipe line) may expand or contract due to temperature changes. Similarly, the pressure exerted on the sealing surfaces of ring 12 by surfaces 9 and 10 expands the ring 12 as a unit and permanent sealing condition is produced at the surfaces 9 and 10. When I say the ring is expanded as a unit or contracted as a unit, I mean that the ring is expanded (or contracted) throughout its entire length. In fact in actual practice with rings of the proportions shown in the drawing, the geometrical configuration of the rings' cross section (taken as in the drawing) is maintained insofar as the eye can detect, but the circumference of the ring is increased or diminished as the case may be. In such a case the geometrical change in the ring in actual practice is similar in kind (not necessarily degree) to the geometrical change caused by a change in temperature of the ring.

In the finished joint, as shown in Fig. 2, the surfaces 7 and 8 have been moved a considerable distance over their companion sealing surfaces on the ring 11, and the ring 11 has been so contracted that its circumference is appreciably less than its normal circumference (i. e. the original circumference). Similarly, the surfaces 9 and 10 have been moved a considerable distance over their companion surfaces on the ring 12, and the ring 12 has been so expanded as a unit that its circumference is appreciably greater than its normal circumference. In the finished joint, the flanges 4 and 5 are preferably in contact as shown in Fig. 2 so that there is a rigid mechanical connection between the two sections of pipe independently of the sealing rings 11 and 12. Any bending stresses which may be put upon the pipe are resisted at the joint by the bolted flanges and hence such stresses can not impair the seal.

In the form of the invention shown in Figs. 3 and 4, inclined sealing surfaces 20, 21, 22 and 23 are formed on the pipe flanges by separate annular recesses in each of the flanges. A sealing ring 24, which is adapted to be expanded, has inclined annular sealing surfaces cooperating with the surfaces 20 and 21; and a second sealing ring 25, which is adapted to be contracted, has inclined annular surfaces cooperating with the surfaces 22 and 23. The construction is just the reverse of that shown in Figs. 1 and 2 in that the sealing ring which is to be contracted is located within the sealing ring that is to be expanded, instead of the reverse arrangement of rings shown in Figs. 1 and 2.

The parts are initially assembled as shown in Fig. 3 and as shown in this figure, the interior diameter of the ring 25 is considerably larger than the interior diameter of the pipe. As the flanges are drawn together by any suitable means, such as bolts 26, the surfaces 20, 21, 22 and 23 are lapped into sealing fit with the corresponding surfaces on the rings 24 and 25; and the ring 24 is circumferentially expanded as a unit, and the ring 25 is circumferentially contracted as a unit. In the finished joint (Fig. 4) the ring 25 has been so contracted that its interior diameter is substantially equal to the interior diameter of the pipe. In this form of the invention, pressure within the pipe is applied to the contracted sealing ring 25, thus tending to restore it to its normal condition and thereby adding to the sealing pressure at the surfaces 22 and 23.

The construction shown in Figs. 5 and 6 is similar to that shown in Figs. 1 and 2 but between sealing ring 30, which is to be contracted, and sealing ring 31, which is to be expanded, there is provided an abutment ring 33. This abutment ring is of such dimensions and material that it is not adapted to be either expanded or contracted. The parts are initially assembled as shown in Fig. 5, and then the pipe ends are drawn together by any suitable means causing inclined surfaces 34 and 35 to be lapped into sealing fit with the corresponding surfaces of ring 30 and contract ring 30 as a unit; and also causing inclined surfaces 36 and 37 to be lapped into sealing fit with the corresponding surfaces of ring 31 and expand the ring 31 as a unit.

In the finished joint (Fig. 6) the sealing ring 30 has been contracted into engagement with the abutment ring 33, and sealing ring 31 has been expanded into engagement with the abutment ring 33. It is apparent, therefore, that the abutment ring serves to reenforce each of the rings 30 and 31, and hence the rings 30 and 31 do not in themselves have to have sufficient strength to withstand the pressure placed within the pipe. In fact, this construction enables rings 30 and 31 to be made of somewhat softer material than would otherwise be feasible. Abutment ring 33 may be made of such length with reference to the depth of the recesses 38 and 39 that in the finished joint, the ends of the ring 33 engage the bottoms of the recesses as shown in Fig. 6, and thus produce a certain amount of seal. This form of the invention produces a triple seal, first with the ring 31, second with the ring 33, and third with the ring 30.

Where a single sealing ring such as ring 12 (Fig. 1) is expanded, a heavy constricting pressure is placed upon the ends of the pipe. However, by the use of a contracted ring in addition to the expanded ring, there is an expanding pressure that largely offsets the constricting pressure as far as the end of the pipe proper is concerned. Accordingly, the finished joint has the ends of the pipe proper in a condition of approximately neutral stress (as in Fig. 4, for example). This characteristic of the present invention peculiarly adapts it for joining pipes having thin walls or made of relatively soft metal.

The wedging action which is exerted on the sealing rings as the joint is drawn up is one which has great mechanical advantage, and hence large sealing pressures may be exerted with relatively small forces applied by the bolts or other means used to draw the pipe ends together. The amount of mechanical advantage obtained depends, of course, upon the angle of inclination of the sealing surfaces. If a small angle be used, (i. e., measured from the axis of the pipe) a large mechanical advantage is obtained, but the sealing rings must have a relatively long length, and the ends of the pipe must be moved a relatively large distance, in order to obtain a given expansion or contraction of the ring, as the case may be. On the other hand, if the angle of the sloping surfaces be large, the conditions are just the reverse. An angle should be used which best suits the particular purpose, but I have found that for many purposes an angle of 16 degrees is satisfactory, as it is very desirable that the sealing rings used be relatively short measured axially.

In practice, there is a maximum permissible pull which can be exerted by the bolts, and hence there is a corresponding limit to the cross sectional area of the rings. In other words, if the cross sectional area of the rings be too great, the maximum permissible pull of the bolts will not be sufficient to effect the expansion and contraction of the rings. Hence making the rings short enables them to be made thick, and thick rings will withstand higher pipe line pressures than thin rings. The length of the rings and the angle of the sealing surfaces should be such as to take care of manufacturing variations in the size of the rings and the size of the pipe ends, i. e. to insure that the parts will readily start together, and that complete drawing together of the pipe ends will effect sufficient expansion and contraction of the rings and adequate lapping of the sealing surfaces.

As the parts are assembled preparatory to drawing up the joint the sealing rings are floating and act to automatically align the pipe ends with each other and with the sealing rings. The contacting surfaces are so effectively lapped into a sealing fit that ordinary commercial machining methods are sufficiently accurate in making the parts and the joint does not require great care in assembly. In fact, in actual practice a fluid tight seal is obtained by the time a fraction of the lapping action has been completed.

The exact dimensions and material of the rings are not important so long as they are such as to permit the rings to act as above described. In general, the material of the rings should preferably have elasticity and is preferably ductile or malleable or worked metal similar to, or somewhat softer than, the pipes to be joined. The ring which is expanded should have tensile strength, unless a guard ring is used as in Fig. 5. Steel rings may be used for steel pipe and brass rings for brass pipe. Either steel or brass rings might be used for cast iron pipe. With the form of the invention shown in Figs. 5 and 6, somewhat softer metals, such as copper, may be used for the sealing rings. The cross sectional proportions of the sealing rings (i. e. axial length to cross axial thickness) and the material of the rings are such that the rings expand as a unit (or contract as a unit) when pressure is applied to the sealing surfaces, as has previously been pointed out; but the exact proportions and dimensions of the rings may be varied considerably. The rings may have a thickness slightly less than the thickness of the pipe and a length slightly greater than twice their thickness.

It is realized that the present invention may assume forms other than those specifically disclosed and may be used for purposes other than connecting together sections of pipe. Accordingly, the present disclosure is to be considered as illustrative, in compliance with the patent statutes, and is not to be considered as limiting.

Having described my invention, what I claim is:

1. A fluid tight joint structure comprising two elements to be joined, the elements being provided with two pairs of inclined annular sealing surfaces, one pair of which is adapted to expand a sealing ring and the other pair of which is adapted to contract a sealing ring as the said elements are moved toward one another; a sealing ring contacting with one of said pairs of surfaces; a second and separate sealing ring contacting with the other of said pairs of surfaces; and means to move said elements toward one another to lap said sealing surfaces into sealing fit with the rings and to expand one ring as a unit and circumferentially contract the other ring as a unit.

2. A fluid tight joint structure comprising two elements to be joined, the elements being provided with two pairs of inclined annular sealing surfaces, one pair of which is adapted to expand a sealing ring and the other pair of which is adapted to contract a sealing ring as the said elements are moved toward one another; a sealing ring having inclined annular surfaces contacting with one of said pairs of surfaces; a second and separate sealing ring having inclined annular surfaces contacting with the other of said pairs of surfaces; and means to move said elements toward one another to lap the contacting surfaces into sealing fit and to expand one ring as a unit and to contract the other ring as a unit.

3. A fluid tight joint structure comprising two elements to be joined said elements being provided with two pairs of inclined annular sealing surfaces; means holding the two elements together; a sealing ring in sealing engagement with the first of said pairs of surfaces, said ring being held in circumferentially contracted condition by pressure applied by the first of said pairs of surfaces; a second sealing ring in sealing engagement with the second of said pairs of surfaces, said second sealing ring being held in circumferentially expanded condition by pressure applied by the second of said pairs of surfaces; and an abutment ring positioned between said sealing rings and in contact with each of them to support them against the forces holding them in their changed condition.

4. A fluid tight joint structure comprising two elements to be joined, the two elements being recessed to provide two pairs of inclined annular sealing surfaces; means holding the two elements together; a sealing ring in sealing engagement with one of said pairs of surfaces; a second sealing ring in sealing engagement with the other of said pairs of surfaces; and an abutment ring positioned between said sealing rings, the ends of the abutment ring engaging the bottoms of said recesses.

5. A fluid tight joint structure comprising two sections of pipe provided with flanged ends, said ends being recessed to provide two pairs of inclined annular sealing surfaces; a sealing ring having inclined annular surfaces on its exterior contacting with one of said pairs of surfaces; a second and separate sealing ring having inclined annular surfaces on its interior contacting with the other of said pairs of surfaces; an abutment ring between the sealing rings; and means to draw the flanges toward one another to lap said pairs of surfaces in sealing engagement with the sealing rings and circumferentially contract one sealing ring and circumferentially expand the other sealing ring.

6. Means for making a fluid tight joint between two elements comprising a sealing ring having on its interior a pair of inclined annular surfaces, said ring being adapted to be circumferentially expanded as a unit when sufficient pressure is applied to its inclined surfaces; and a second and separate sealing ring concentric with the first and having on its exterior a pair of inclined annular surfaces, said second ring being adapted to be circumferentially contracted as a unit when sufficient pressure is applied to its inclined surfaces.

7. Sealing means for making a fluid tight joint between two elements comprising a sealing ring having on its exterior a pair of inclined annular surfaces, said ring being adapted to be circumferentially contracted as a unit when sufficient pressure is applied to said inclined surfaces; a second sealing ring concentric with the first sealing ring and having on its interior a pair of inclined annular surfaces, said second sealing ring being adapted to be circumferentially expanded as a unit when sufficient pressure is applied to its annular surfaces; and an abutment ring concentric with the sealing rings and positioned between the two.

8. The structure set forth in claim 3, in which the ends of the abutment ring have a seal relation to the elements to be joined.

9. A joint structure comprising two elements to be joined, sealing means comprising a pair of separate rings each having sloping surface contact with each of said elements, one of said rings being adapted to be expanded by reason of said sloping surface contacts when the elements are moved towards each other; a third ring concentric with the other two and positioned between them; and means for moving the elements towards one another to intensify the surface contacts and effect sealed joint relation between the elements and the rings.

10. A joint structure comprising two elements to be joined, sealing means comprising a pair of separate rings each having sloping surface contact with each of said elements, one of said rings being adapted to be contracted and the other of said rings being adapted to be expanded by reason of said sloping surface contacts when the elements are moved towards each other; a third ring concentric with the other two and positioned between them, the third ring having a seal relation to the elements to be joined when the elements have been moved towards each other to a predetermined extent; and means for moving the elements towards one another to intensify the surface contacts between the pair of rings and the elements and thereby effect a sealed joint relation between said rings and the elements.

11. A joint structure comprising two elements to be joined, sealing means comprising a pair of separate rings each having sloping surface contact with each of said elements, one of said rings being adapted to be contracted and the other of said rings being adapted to be expanded by reason of said sloping surface contact when the elements are moved towards each other; a third ring concentric with the other two and positioned between them, the third ring having a seal relation to the elements to be joined when the elements have been moved towards each other to a predetermined extent and being longer than the other two rings; and means for moving the elements towards one another to intensify the surface contacts between the pair of rings and the elements and thereby effect a sealed joint relation between said rings and the elements.

In testimony whereof I affix my signature.

WYLIE G. WILSON.